United States Patent [19]

O'Neill

[11] Patent Number: 4,602,133

[45] Date of Patent: Jul. 22, 1986

[54] ADAPTIVE ECHO CANCELLING SYSTEM AND METHOD UTILIZING LINEAR CODE SPACING

[75] Inventor: John F. O'Neill, Boulder, Colo.

[73] Assignee: GTE Lenkurt Incorporated, San Carlos, Calif.

[21] Appl. No.: 401,188

[22] Filed: Jul. 23, 1982

[51] Int. Cl.⁴ .............................................. H04B 3/20
[52] U.S. Cl. ................................. 179/170.2; 364/606
[58] Field of Search ............... 179/170.2, 170.8, 170.6; 364/606, 724

[56] References Cited

U.S. PATENT DOCUMENTS

| | | | |
|---|---|---|---|
| 3,836,734 | 9/1974 | Campanella et al. | 179/170.2 |
| 3,894,200 | 7/1975 | Campanella et al. | 179/170.2 |
| 4,057,696 | 11/1977 | Gitlin et al. | 179/170.2 |
| 4,064,379 | 12/1977 | Horna | 179/170.2 |
| 4,168,528 | 9/1979 | Comer | 364/606 |
| 4,349,889 | 9/1982 | van den Elzen et al. | 179/170.2 |

Primary Examiner—Gene Z. Rubinson
Assistant Examiner—R. Vaas
Attorney, Agent, or Firm—Anthony Miologos; Peter Xiarhos

[57] ABSTRACT

An improved adaptive echo cancelling system and method is disclosed. The system and method utilizes linear code spacing and is particularly well suited for echo cancellation of full scale signals. Echo cancellation is effected by use of digital-to-analog converters functioning as a multiplier receiving first digital signals representative of a received speech waveform signal and second digital signals representative of the termination network on the line, which termination network causes and defines an echo reflection of the received signal. The output of the multiplier is summed and the sum is then subtracted from the echo components of the received signal to thus achieve echo cancellation and to produce an error signal that is utilized to continuously reduce error between the actual and estimated echo waveforms. Provision is made to inhibit error indications due to circuit generated coding noise and/or predetermined small detected errors to thereby enhance system operation.

18 Claims, 13 Drawing Figures

Fig_1A

Fig_1B

Fig_2

Fig_3

Fig_4

Fig_5

Fig_6

Fig_7

Fig_8

Fig_9

Fig_10

*Fig_11A*

*Fig_11B*

ADAPTIVE ECHO CANCELLING SYSTEM AND METHOD UTILIZING LINEAR CODE SPACING

FIELD OF THE INVENTION

This invention relates to an echo cancelling system and method and, more particularly, relates to an improved adaptive echo cancelling system and method utilizing linear code spacing.

BACKGROUND OF THE INVENTION

Echo cancelling systems are well known in the prior art, and many diverse systems have heretofore been utilized and/or suggested.

In conjunction with such systems, it has been heretofore suggested that an adaptive algorithm can be utilized to enable a transversal filter to act as a self-controlling waveform conditioner, and resulting systems have been heretofore used for both data transmission and voice echo control. For signals in a dispersive transmission media (i.e., channels with linear distortion such as a non-flat gain or non-linear phase), use of such systems has been found to permit a higher level of utilization (i.e., permits a faster data rate or less echo) than would otherwise be feasible.

Figure 11A:
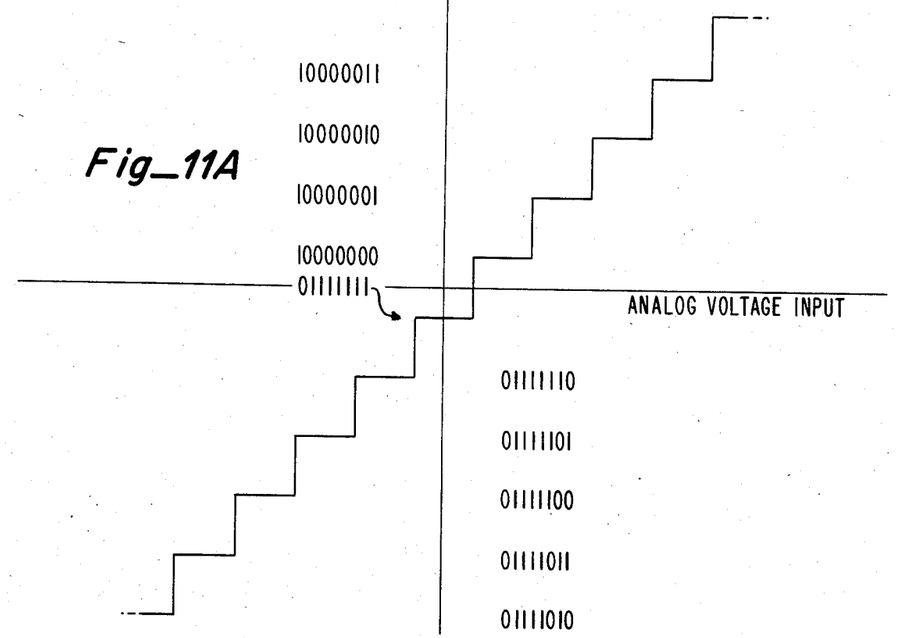
FIGS. 11A and 11B are typical waveforms to illustrate a comparison between linear (uniform) code space (as shown in FIG. 11A) and companding (non-uniform) code space (as shown in FIG. 11B).
Figure 11B:
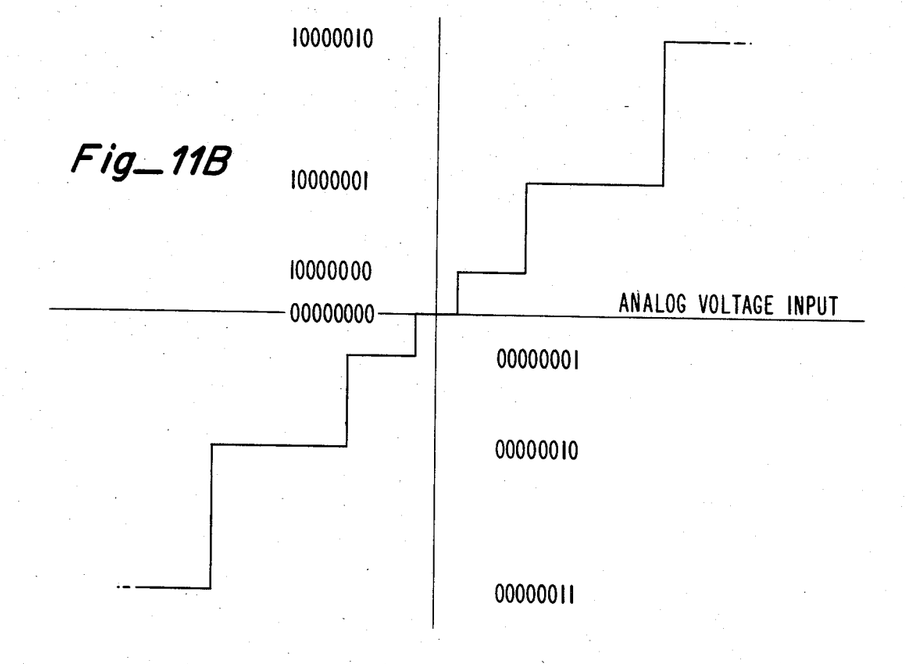

Heretofore, it has been common to achieve echo cancellation through utilization of stepwise linear approximations to logarithmic code spaces for both coding the arriving speech signal and for storing the termination parameters. A primary consideration for use of such an approach is that digital adding circuits (which are much less complex than digital multiplication circuits) can be conveniently used in the digital multiplication process since the logarithm of the product of two numbers is the arithmetic sum of their separate logarithms. Companding code spaces are somewhat more complex to generate, however, than are linear, or uniform, code spaces and, in addition, require added circuitry to linearize the code space before the pairwise product terms can be added together to build up the necessary echo sample value. FIGS. 11a and 11b typically illustrate differences between linear and companding, or logarithmic, code spaces.

A self-adaptive echo canceller is shown in U.S. Pat. No. 3,500,000, and, in conjunction therewith, the adaptive algorithm, as used in this invention, is set forth. While the system, as shown in U.S. Pat. No. 3,500,000, is the basic approach utilized in this invention, there is no teaching of use of linear code spacing or circuitry which enables effective use of such spacing for echo cancellation.

An improved adaptive echo canceller is shown in U.S. Pat. No. 3,836,734, but, again, linear code spacing and/or associated circuitry for effective use is not utilized and error correction is achieved by multi-element threshold detectors in the adaptive control loop for varying each component of the termination signal by different amounts.

SUMMARY OF THE INVENTION

This invention provides an improved echo cancelling system and method that is relatively simple yet effective. The system and method utilizes linear code spacing and provides circuitry permitting effective use of such spacing for echo cancellation.

It is therefore an object of this invention to provide an improved echo cancelling system and method.

It is another object of this invention to provide an improved echo cancelling system and method that is relatively simple yet effective.

It is still another object of this invention to provide an improved echo cancelling system and method that utilizes linear code spacing.

It is still another object of this invention to provide an improved echo cancelling system that utilizes linear code spacing and associated circuitry for more effective use of such spacing for echo cancellation.

It is still another object of this invention to provide an improved echo cancelling system and method for dynamically measuring incoming speech signals and adjusting echo control parameters to suit actual line conditions.

With these and other objects in view, which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

The adaptive algorithm utilized in this invention is set forth in basic form in U.S. Pat. No. 3,500,000. This algorithm is based on a discrete convolution process in which a first group of numbers specifying the signal to be processed (usually the arriving signal) is multiplied pair-wise by a second like group of numbers representing the filter characteristics desired. The pair-products are then summed to produce a sample on a continuous "result" waveform, which could be a data output waveform or a speech waveform designed to be an estimate of some real echo waveform. The algorithm acts on the second group of numbers to continuously reduce the error toward a predetermined criteria that is between the resulting waveform and a preselected ideal waveform. For echo cancellation, the echo estimate is subtracted from the actual echo.

In the case of telephonic communications, the signal arriving at a station is the band-limited speech from another, or distant, speaker, which will normally generate an echo waveform as the reflection from various transmission features. To achieve error cancellation, the arriving signal is sampled periodically and digitally coded to produce the first group of numbers used in the convolution process. The second group of numbers generated to convolve with the first group of numbers represents the termination network, which generates, by reflection, the actual echo waveform. As used herein, this second group of numbers may be referred to as termination parameters, or "taps", because they represent an internal estimate made by the canceller circuitry that is constantly updated (in the same manner as shown and described in U.S. Pat. No. 3,500,000) by modeling the complex line termination creating the echo. The use of the term "taps" reflects the formerly common use of a tapped analog delay line to generate the outputs of the transversal filter structure (all modern echo cancellers, however, use digital storage means to perform this signal delay function).

The conventional sampling rate for the incoming speech signal is 8000 per second, which has been found to be sufficient to generate an echo estimate of sufficient bandwidth to achieve accurate echo cancellation. Since the echo may be delayed up to 25 or 30 milliseconds due to transient time in the loop from the "local" termination, a large number of signal samples and termination parameters must be stored, conventionally 256 each. This leads to requirements in the design of echo cancellers for fast data processing, in that the convolution process of 256 pairwise multiplications and addition of all products must be performed at the 8000 per second rate in order to generate a full-bandwidth echo estimate. The large size of the stored number sets also places strong accuracy requirements on the process, especially in avoiding accumulation of many small errors in the process.

This invention utilizes a different approach to coding the two groups of numbers which must be convolved, namely use of a linear code space (as shown in FIG. 11A), rather than the conventional companding logarithmic code space (as shown in FIG. 11B) now in wide use.

The logarithmic code space is non-uniform and provides a relatively uniform maximum coding error of approximately 1.5% of signal for a wide range of signal amplitudes. It is therefore well suited for coding voice telephone signals, which vary widely in amplitude and for which it is desired to maintain a uniform signal-to-noise ratio for all signal amplitudes.

An 8-bit linear code space provides significantly less maximum coding error for full scale signals; i.e. 1/256 of full scale, or 0.39%, but has progressively greater error for small signals. For signals at approximately 12dB below full scale, the linear and logarithmic code spaces have equal maximum error. For small signals, the logarithmic coding has less maximum coding error.

For an echo canceller, the coding criterion is not necessarily optimized for equal signal-to-noise ratio for all signal amplitudes. The most objectionable echo case occurs for a loud speaker and a line with poor echo return loss (ERL). The loud speaker causes a relatively loud echo, which is more audible in double-talk situations (i.e., both speakers talking). This is the most difficult case for echo cancellation. The poor ERL case corresponds, also by definition, to the loudest echo.

The linear code space approach of this invention is, therefore, most suitable for echo canceller design, since the worst case echo situation occurs when the larger magnitude (closer to full-scale) signal codes must be used (as, for example, with a strong speaker), and the larger magnitude (closer to full-scale) termination codes must therefore be used to represent a termination with poor ERL. For lowamplitude speakers and good ERL termination, linear code space is not as accurate as companding logarithmic code space, but these situations correspond to relatively less echo, and the inefficiency for this case is advantageously traded off for better coding accuracy in the severe echo case.

An effective echo canceller must cancel an echo delayed by many milliseconds, and, therefore, must be able to store large groups of both the signal samples and the termination parameters that must be pairwise multiplied. A common size of each of these groups is 256 numbers, which stores 32 milliseconds of arriving signals (at the normal sampling rate of 8000 per second).

When these numbers are derived according to a linear code space, an accumulation of coding errors can occur which potentially reduces the accuracy with which the estimated echo resembles the actual echo (as stated earlier, the linear code space approach can result in a relatively poor approximation to a small signal).

In this invention, the unfavorable consequence of using a linear code space for signal and termination parameters is avoided by use of additional information about the line termination that is not normally incorporated in the adjustment algorithm.

Considering the source of the echo in more detail, the echo arises from either a 4-wire to 2-wire conversion via a conventional hybrid circuit function or from any discontinuity of the 2-wire section of the channel. Examples of a 2-wire discontinuity would include a splice between two different cable gauges, or a telephone at the end of the cable.

With respect to the echo seen by the canceller, a limited number of echoes are present (which may be separated in time or may overlap one another) and the dispersion of the individual echoes is limited to a few milliseconds because reasonably low amounts of gain and delay distortion are necessitated by the requirement that a channel have good speech propagation or carry data signals. Thus, it is known that most of the termination parameters (conventionally 256) have zero as their correct value.

In this invention, a circuit capable of detecting that a contiguous sub-group of termination parameters is small, and causing that sub-group to produce exactly zero pair-products, reduces the overall error in the echo estimate. Also, in this invention, the same type of error is reduced by an intentional bias in the tap adjust algorithm tending to increase the speed at which relatively uncorrelated termination parameters, (which should be set to zero), converge to the center of the code space. These arrangements work together to make the simpler linear code space arrangement perform as well as the conventional companding logarithmic code space arrangement but without introducing the complications inherent in the logarithmic code space arrangement.

Figure 1A:
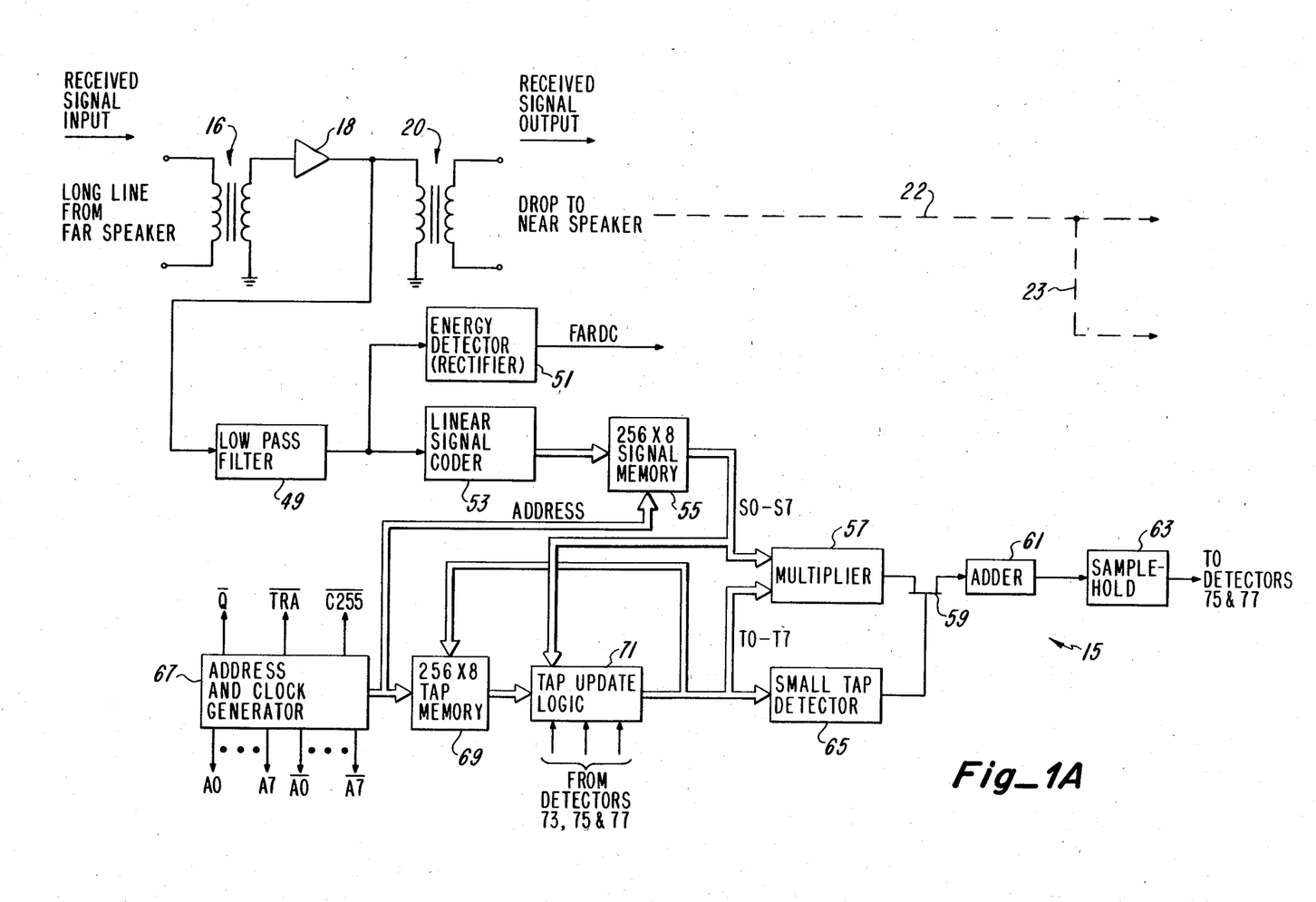
FIGS. 1A and 1B, taken together, form a block diagram of the adaptive echo cancelling system of this invention.
Figure 1B:
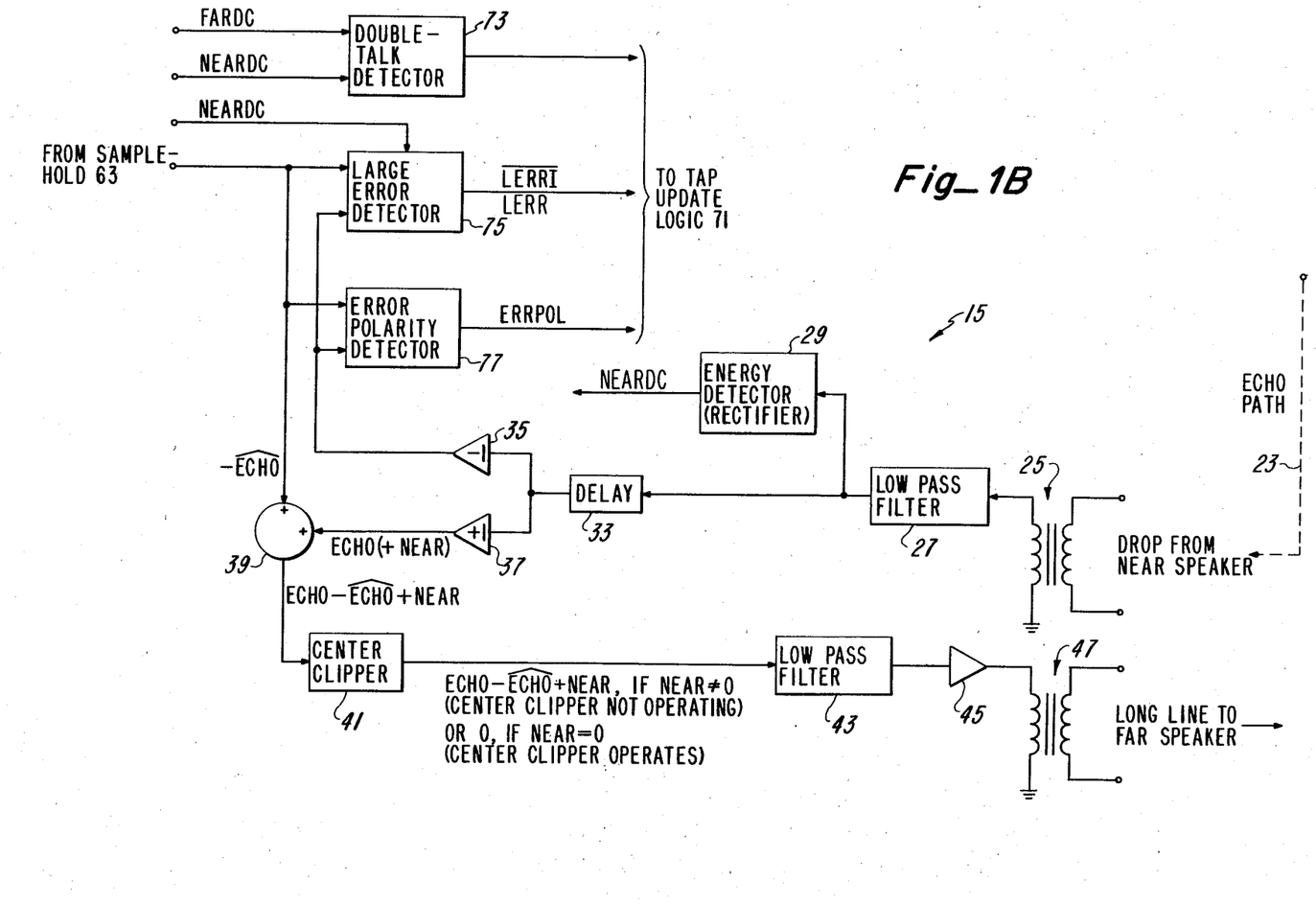

The adaptive echo cancelling system 15 of this invention is shown in FIGS. 1A and 1B. As shown, the long line from a far speaker (carrying the received input signal) is connected to the primary winding of transformer 16, the secondary winding of which is connected through amplifier 18 to the primary winding of transformer 20. The secondary winding of transformer 20 provides the output signal which is dropped to a near speaker via line 22. As indicated in FIGS. 1A and 1B for purposes of illustration, an echo path via line 23, is established on the drop from the near speaker, which echo is coupled to the primary winding of transformer 25. The secondary winding of transformer 25 is connected through low pass filter 27 to an energy detector (rectifier) 29 (providing a NEARDC output signal), and through delay circuit 33 to amplifiers 35 and 37. The output from amplifier 37 is coupled to summation (echo cancelling) circuit 39 with the output from circuit 39 being coupled through center clipper 41, low pass filter 43, and amplifier 45 to the primary winding of transformer 47, the secondary winding of which is connectable with a long line to a far speaker.

The signal from amplifier 18 is also coupled through low pass filter 49 to energy detector (rectifier) 51 (to provide the FARDC output) and to linear signal coder 53. Linear signal coder 53 may be conventional and provides the linear code spacing utilized in this invention. The output of linear signal coder 53 is coupled on eight lines to a 256 word, 8 bit per word signal memory unit 55. The output from memory unit 55 is likewise coupled on eight lines as one input of multiplier 57. The output of multiplier 57 is coupled through transistor 59 to adder 61, with the output of adder 61 being coupled to sample-hold circuit 63.

Transistor 59 is also connected with small tap detector unit 65. An address and clock generator unit 67 is utilized for timing. An eight line output from address and clock generator 67 is coupled as an address input to signal memory unit 55 and to tap memory unit 69. The output of tap memory unit 69 is coupled through tap update logic circuit 71, which provides the second eight line input to multiplier 57 and an input to small tap detector unit 65.

Tap update logic circuit 71 also receives an input from double-talk detector unit 73 and inputs from large error detector unit 75 and error polarity detector unit 77, each of which receives the output from sample-hold circuit 63.

Figure 2:
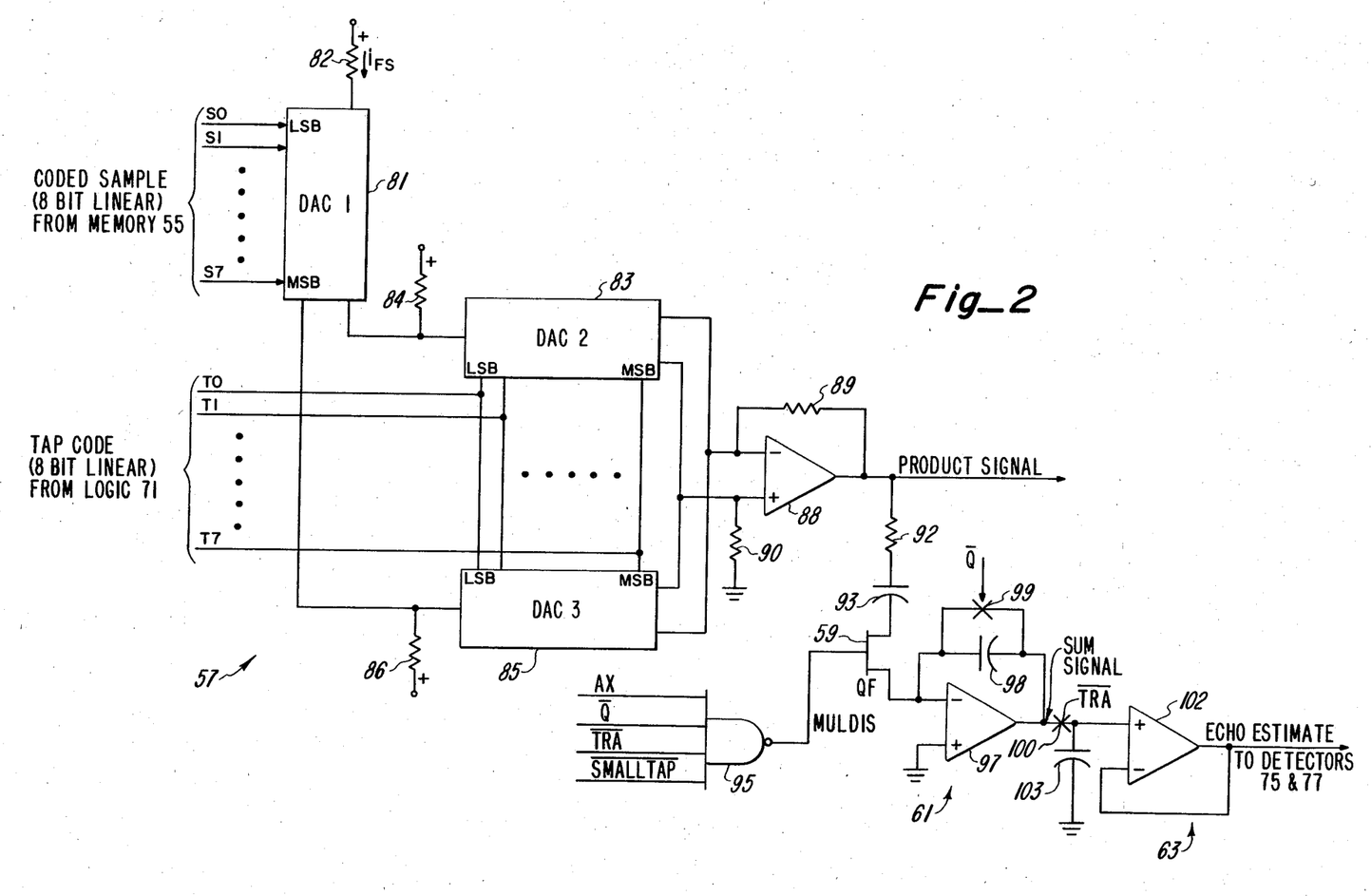
FIG. 2 is a block and schematic diagram of the multiplier, adder and sample-hold circuits shown in block form in FIG. 1.

Multiplier 57, adder 61 and sample-hold circuit 63 are shown in greater detail in FIG. 2. The use of linear code spaces to receive both signals and "taps" allows the multiplication process $P_i = S_i T_i$ to be performed by precision digital-to-analog converters (DAC's) which provide great savings and reduction in circuit complexity with little or no degradation in overall system performance.

As shown, the eight line coded sample input from memory 55 is coupled to first digital-to-analog converter (DAC) 81. A second digital-to-analog converter 83 is connected with converter 81 with the connection therebetween being connected through resistor 84 to a positive power source. Digital-to-analog converter 83 is connected with a third digital-to-analog converter 85, with digital-to-analog converters 81 and 85 being connected with one another and with the positive voltage source through resistor 86. Resistors 84 and 86 have been added to improve the biasing aspects of the circuit. These resistors force current into the internal operational amplifier nodes of digital-to-analog converters 83 and 85 to improve their voltage swing capability.

The eight line tap code input from logic circuit 71 is coupled to digital-to-analog converters 83 and 85. The outputs from converters 83 and 85 are coupled to operational amplifier 88 (such as an LM 318), the output of which is fed back to the negative input through resistor 89, with the positive output being connected with ground through resistor 90. The output of operational amplifier 88 (the product signal) is coupled through series connected resistor 92 and capacitor 93 to transistor 59. As shown in FIG. 2, the MULDIS input to transistor 59 is coupled thereto through NAND gate 95.

Adder circuitry 61 is also connected to transistor 59, and, more particularly, the negative input of operational amplifier 97 is connected to transistor 59. The output of operational amplifier 97 is fed back to the negative input through summing capacitor 98. An analog switch with control input ($\overline{Q}$) is coupled to opposite sides of capacitor 98 at junction 99 and is used to quench (reset) summing capacitor 98 to zero signal at the end of a summing interval (about ⅛ milliseconds).

The output from operational amplifier 97 is coupled to junction 100 (junctions 99–100 may be analog switches such as a PMI SW 201 with low active input), which is controlled by the $\overline{TRA}$ input, and the resulting signal is coupled to the positive input of operational amplifier 102, with the positive input also being connected with ground through capacitor 103. The $\overline{TRA}$ input precedes the $\overline{Q}$ input in time, and the result is to cause the adder output signal to be transferred to hold capacitor 103. The output from operational amplifier 102 is the sample and hold output, and is an echo estimate that is coupled to detectors 75 and 77.

As shown in FIG. 2, a digital gating function is provided as a part of a MULDIS waveform to reduce or eliminate the noisy error signals from the multiplier (formed by the three analog-to-digital converters) during changes of digital input states and from small tap values. The fourth input to NAND gate 95 (denoted AX) is a signal designed to force the input to field effect transistor 59 (QF) to be high during these unstable state intervals, thus turning off the transistor and preventing these erroneous transient signals from affecting the signal sum in the adder circuit. Signal AX is a simple function of the basic system clock, and is low (active) during the first ⅝ of the tap updating interval when transient error signals occur, and high during the remaining ⅜ of the tap update interval which is ½ microsecond in total duration). The input $\overline{SMALLTAP}$ to gate 95 is explained in conjunction with FIG. 5.

Figure 3:
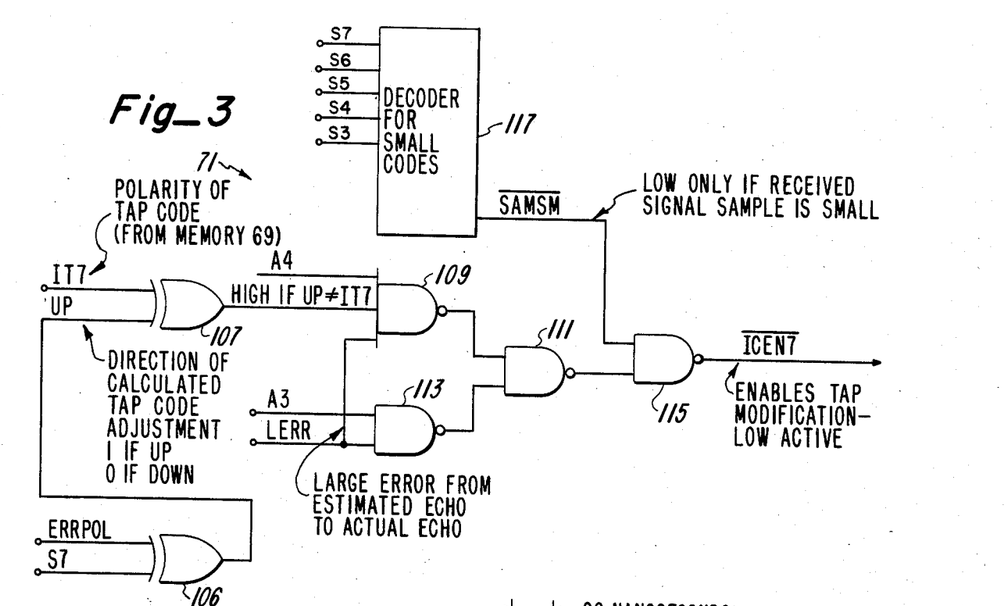
FIG. 3 is a block and schematic diagram of a major portion of the tap update logic circuit shown in block form in FIG. 1.
Figure 4:
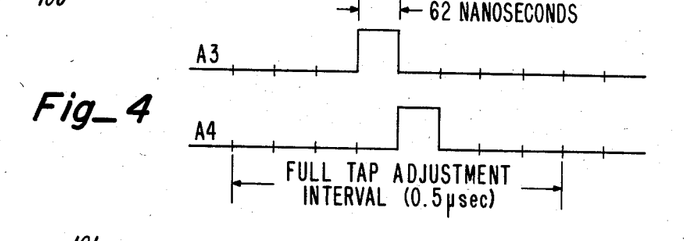
FIG. 4 is an illustration of typical waveform inputs to the logic circuit shown in FIG. 3.

Tap update logic circuit 71 is shown in more detail in FIG. 3. As shown, the polarity of the tap code is derived by utilizing the input IT7 (from memory 69 through tap update logic unit 71), while the direction of the calculated tap code (UP) is derived by coupling an ERRPOL input (from error polarity detector 77) and S7 (from memory 55) input through exclusive OR circuit 106. These input signals are coupled to exclusive OR gate 107 the output of which is coupled as one input to NAND gate 109. The output from NAND gate 109 is coupled as one input to NAND gate 111 which receives its second input from NAND gate 113. NAND gates 109 and 113 receive, as a second input, the A4 and A3 input signals, respectively, which are shown typically in FIG. 4. The output from NAND gate 111 is coupled as one input to NAND gate 115 which receives as a second input an output from small signal code decoder unit 117. The output from NAND gate 115 is the $\overline{ICEN7}$ output which allows the tap update counter to be incremented or decremented by either one count or two counts.

The normal adjustment algorithm for the "taps" requires that an adjustment be made to the least significant bit of the 12-bit tap word under certain conditions (only the eight most significant bits of the tap are used to generate the estimated echo with the least significant 4 bits providing pre-integration, or smoothing, of the tap adjustment process). NAND, gates 111, 113 and 115 produce a low enable signal at $\overline{\text{ICEN7}}$ during the clock enable pulse A3, if, and only if, the LERR input signal is high (which indicates the difference between the estimated echo and the actual echo is significant and not trivial), and the $\overline{\text{SAMSM}}$ signal is high (which indicates that the particular received signal sample currently being examined, to determine which direction the tap must be adjusted, is significant and not trivial in amplitude). Thus, the normal tap adjustment is made if both the error and the received signal are large enough to provide a reliable direction of change for the tap to thereby reduce contribution to the error of the particular tap then addressed.

Bias is provided by gates 107 and 109. Exclusive OR gate 107 generates a high output signal if its input signals are different (i.e. one high and the other low). The first of these input signals is IT7 which is the most significant bit of the tap code, and also represents the polarity of the tap value (i.e., plus or minus). The other input is the signal UP, which gives the direction in which the tap value is to be changed (as calculated by the conventional algorithm according to the prior art). If the tap is positive, and is to be decremented, it is becoming smaller in magnitude; if the tap is negative, and is to be incremented, it is also becoming smaller in magnitude (moving toward the center of the code space, which represents zero).

Thus, exclusive OR gate 107 generates a high output whenever a tap is to the adjusted to a smaller magnitude. NAND gate 109 is enabled by clock pulse A4 to provide a second low at $\overline{\text{ICEN7}}$ when exclusive OR gate 107 identifies that the tap is to be made smaller in magnitude (in addition to the normal input through NAND gate 113 during clock pulse A3). Thus, if a tap is to be made larger in magnitude, it receives one count per trial; if it is to be made smaller, it receives two counts per trial. A strong bias towards zero occurs for taps that have no significant correlation to the error between estimated echo and actual echo (i.e., the taps that should have zero value).

Figure 5:
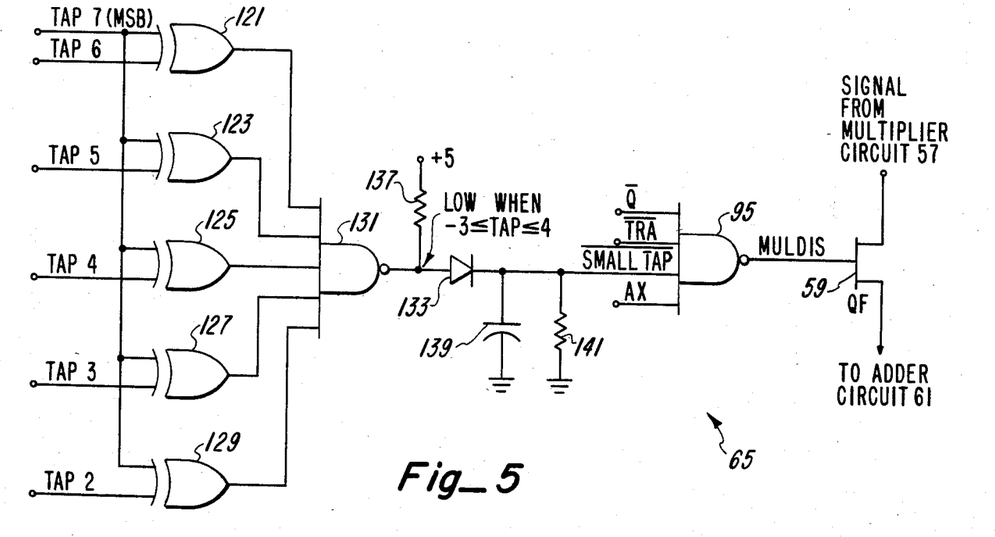
FIG. 5 is a block and schematic diagram of the small tap detector circuit shown in block form in FIG. 1.
Figure 6:
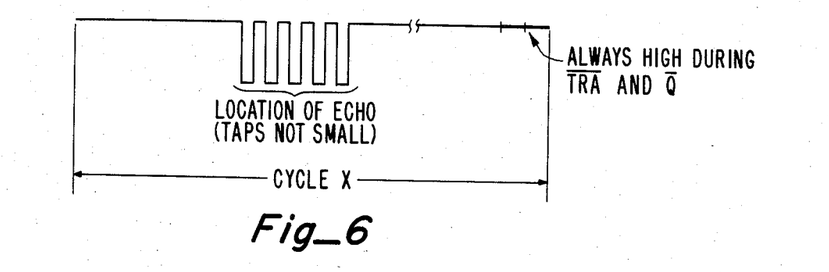
FIG. 6 is an illustration of a typical MULDIS output waveform generated by the small tap detector circuit shown in FIG. 5.

FIG. 5 illustrates, in greater detail, small tap detector unit 65. FIG. 6 illustrates a typical MULDIS waveform defining the location of an echo. In order to prevent the many small taps from contributing a significant error to the estimated echo, they are forced to zero utilizing the circuit shown in FIG. 5.

As shown, exclusive OR gates 121, 123, 125, 127 and 129 are connected to receive the six most significant tap bits and supply an output to NAND gate 131. If the input to these gates is any of the eight codes 011111dd through 100000dd (where d denotes either a high or low signal) then all five gate outputs are high and the output of gate 131 is low. This state identifies the eight "middle" states in the linear binary code space (i.e., the eight smallest magnitude tap values possible).

The output from NAND gate 131 is coupled through diode 133 to NAND gate 95, with the junction of NAND gate 131 and diode 133 being connected with the positive five volt power supply through resistor 137, and the junction of diode 133 and NAND gate 95 being connected with ground through capacitor 139 and resistor 141. The output from NAND gate 95 is the MULDIS input to field-effect transistor 59.

The passive network consisting of diode 133, capacitor 139, and resistors 137 and 141 acts as a pulse stretcher to hold the corresponding input to NAND gate 95 high for several sample adjustment periods after a "large" tap value is detected. This pulse stretching is to allow small (but non-zero) taps that follow the few main taps defining an echo to contribute their effect, and not be set to zero.

The output of gate 95 is denoted MULDIS multiplication disable) and controls field-effect transistor 59 which is connected as an analog transmission gate between multiplier circuit 57 and the adder, or summer, circuit 61. When the MULDIS signal is high (for small tap values), transistor 59 is a high impedance and the small error products from the multiplier are ignored by the summing circuit.

Figure 7:
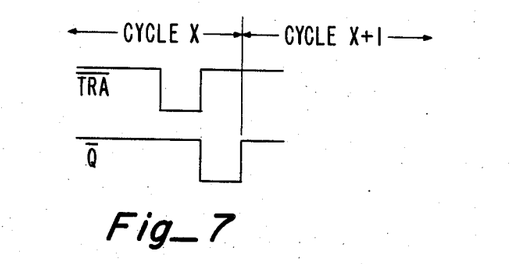
FIG. 7 is an illustration of typical waveform inputs to the small tap detector circuit shown in FIG. 5.

Two other inputs to gate 95 guarantee that the adder has no input during the two signal transfer pulses at the end of the system cycle. These inputs are $\overline{\text{TRA}}$ (the pulse which transfers the sum-voltage to a holding capacitor) and $\overline{\text{Q}}$ (the pulse which resets the adder circuit). These inputs are shown typically in FIG. 7 and illustrated as inputs in FIG. 5.

Figure 8:
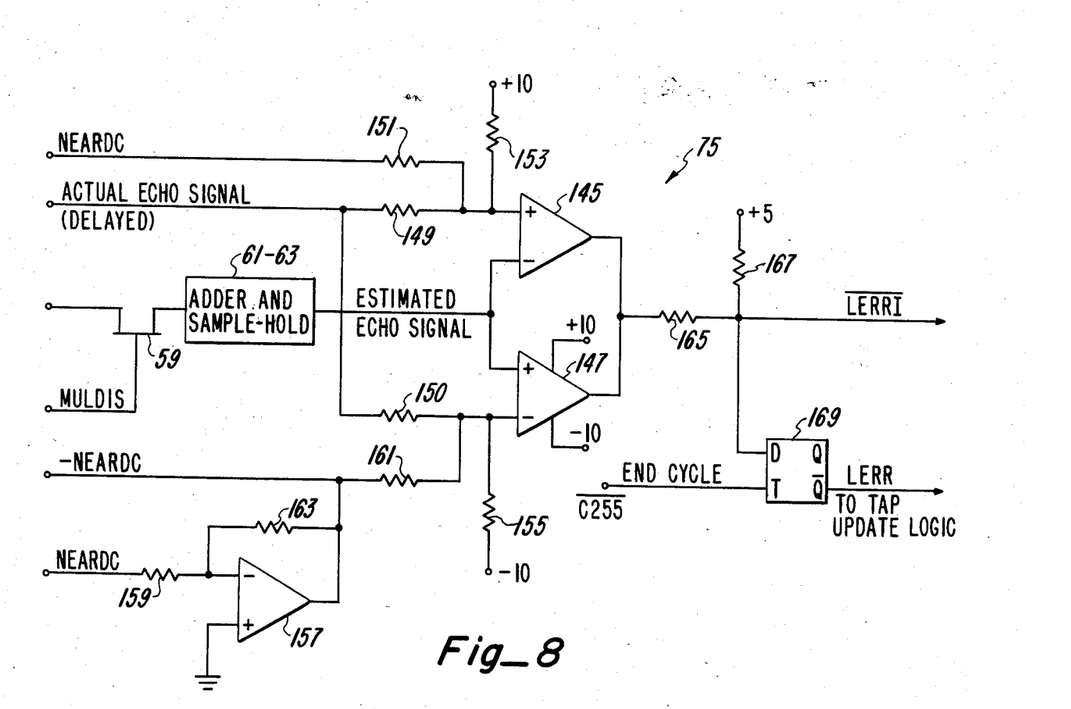
FIG. 8 is a schematic and block diagram of the large error detector circuit shown in block form in FIG. 1.

FIG. 8 illustrates, in greater detail, large error detector circuit 75. As shown, the output from the adder and sample-hold circuits 61 and 63 is the estimated echo signal coupled to detector 75. This signal is coupled to the negative input of comparator 145 and to the positive input of comparator 147, which comparators may be a part of a quad comparator (such as an LM339). The digital large error signal is thus calculated using two fast analog signal comparator circuits which can be conveniently realized.

The positive input of comparator 145 is connected to receive the actual echo signal through resistor 149 while the negative input of comparator 147 is connected to receive the actual echo signal through resistor 150. In addition, the positive input of comparator 145 is connected to receive the NEARDC signal through resistor 151, with the positive input also being connected to a +10 volt power source through resistor 153. The negative input of comparator 147 is also connected to the −10 volt power supply through resistor 155. The NEARDC input is also connected to the negative input of operational amplifier 157 (which may be an LM348) through resistor 159 with the output of operational amplifier 157 being connected through resistor 161 to the negative input of comparator 147 and fed back to the negative input of operational amplifier 157 through resistor 163.

Thus, the actual (delayed) echo signal is applied through a resistor biasing network consisting of resistors 149, 150, 151, 153, 155 and 161. This resistor biasing network creates a variable "window" voltage around the actual echo signal. If the estimated echo is within this window, the detector output signal ($\overline{\text{LERRI}}$) is high, indicating a small error to the tap adjustment logic 71. If the estimated echo is outside the bias window, the detector output signal is low, which indicates a large error.

The bias voltage which creates the window voltages positive and negative of the actual echo is composed of a nearly fixed component due to the current from +V and −V (10 volts) through large-value resistors 153 and 155 (which prevents ambiguous $\overline{\text{LERRI}}$ signals for very small echoes) and a second component which is linearly proportional to the amplitude of the incident echo signal (NEARDC) derived by conventional signal rectifying and smoothing means.

Since both positive and negative versions of this signal power measurement are required, an operational amplifier 157 with a −1 gain is used to provide the negative version. This variable bias is applied to the comparators through resistors 149 and 151 for the positive bias window and resistors 150 and 161 for the negative bias window. The output from comparators 145 and 147 is coupled through resistor 165 as the $\overline{\text{LERRI}}$ output (an inversion is present in the conventional storage means used to store the signal during the tap update cycle) with the output being connected to the +5 volts power supply through resistor 167 and the output also being coupled as one input to flip-flop 169, the other input of which is the "end cycle" input C255 (from address and clock generator 67).

The polarity of the comparator inputs is such as to permit the open collectors of the comparators to be tied directly together. Resistors 165 and 167 provide a level shift to operate a conventional 5 volt flip-flop which has the $\overline{\text{LERRI}}$ signal as input.

The Q output of flip flop 169 provides the LERR output to the tap update logic circuit 71. This output provides information to enable describing whether the difference (error) between the current echo estimate and the actual echo is large enough to provide a reliable tap adjustment (or too small to provide an accurate adjustment) as is necessary for the tap update algorithm.

For proper performance of the algorithm, the large error indicating signal must be scaled accordingly to the amplitude of the arriving echo signal. A given number of millivolts of error would be a small error for a large actual echo, yet would be a large error for a small actual echo. As realized herein, the LERR signal is independent of error signal polarity and the polarity signal is easily calculated by a separate, fast analog comparator of the same type.

Figure 9:
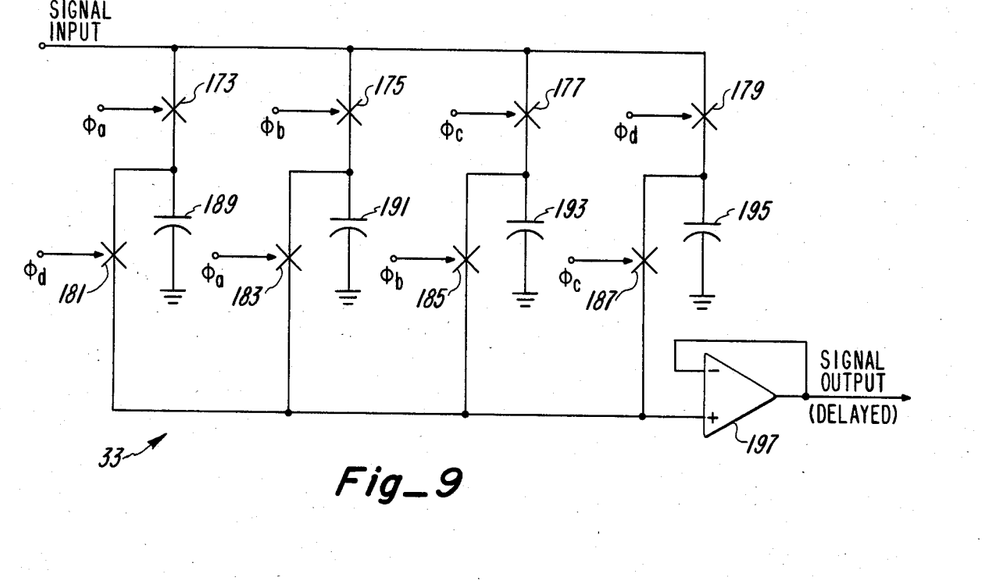
FIG. 9 is a block and schematic illustration of the delay circuit shown in block form in FIG. 1.

FIG. 9 illustrates, in greater detail, delay circuit 33. Delay circuit 33 is necessary since the arriving echo signal must have no component that is present earlier in time than the received signal after filtering and coding processes are performed (since no real circuit can act as a signal predictor in real time). The echo signal and speech from a near speaker must be delayed at the input to the canceller, since no external delay is necessarily present.

Figure 10:
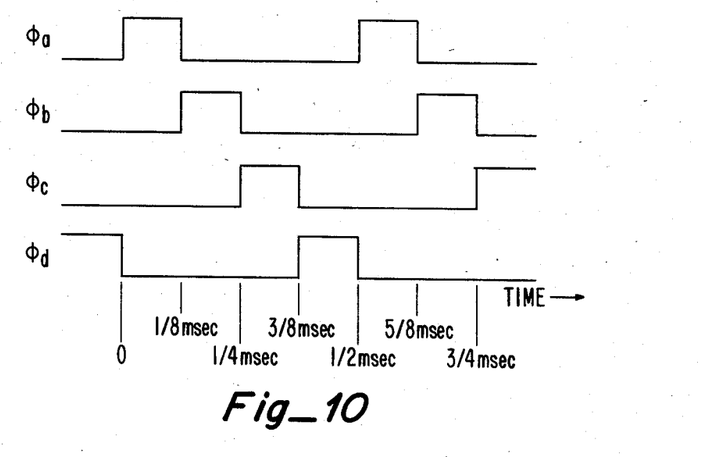
FIG. 10 is a series of typical waveforms showing phase delayed inputs to the delay circuit shown in FIG. 9.

The analog signal is delayed in this invention by delay unit 33 which advantageously eliminates the cost and coding noise associated with coding the signal to use digital delay means. As shown in FIG. 9, delay unit 33 includes a plurality of analog transmission gates 173, 175, 177 and 179, each of which receives a specific phased enable clock input as shown in FIG. 10 and as denoted in FIG. 9. An equivalent set of analog transmission gates 181, 183, 185 and 187 is provided for output purposes.

The input signal is sampled via the transmission gates onto storage capacitors 189, 191, 193 and 195 in fixed sequence 0a, 0b, 0c and 0d. The equivalent set of analog transmission gates (181, 183, 185 and 187) connects each storage capacitor (189, 191, 193 and 195) in turn to a high-impedance output circuit that is realized using an operational amplifier 197, the output of which provides the delayed output signal.

Implementation preferably consists of standard CMOS analog transmission gates with $\frac{1}{8}$ millisecond connection time to each storage capacitor.

Since the storage capacitor is connected to the output for $\frac{1}{8}$ millisecond immediately before being connected to the input for a fresh sample, the total delay through the circuit (for sample signals) is $\frac{3}{8}$ milliseconds. This delay has been found to be adequate to prevent overlap of the filtered and coded receive signal echo. If the input signal is a continuous analog waveform, the delay circuit causes sampling to occur and the effective delay is increased 1/16 milliseconds due to the averaging of the sampled version of the signal required for signal reconstruction.

As can be appreciated from the foregoing, this invention provides an improved adaptive echo cancelling system and method that utilizes linear code spacing and associated circuitry which enhances use for echo cancellation.

What is claimed is:

1. An echo cancelling system connectable with a termination network and utilizing linear code spacing, said system comprising;
   input means for receiving a transmitted input signal;
   linear code spacing means connected with said input means for providing a linearly spaced digital signal output indicative of said signal received at said input means;
   termination network estimating means for providing a digital signal output having linear code spacing, said termination network estimating means including logic update means;
   multiplier means connected to receive said digital signal outputs from said linear code spacing means and said termination network estimating means and multiplying the same to provide a product signal output;
   first detector means connected with said logic update means to provide a control output indicative of predetermined small digital signal outputs from said logic update means;
   gate means connected with said multiplier means and said first detector means to receive the outputs therefrom, and providing an output signal, said output from said first detector means controlling passage of said output from said multiplier means through said gate means;
   product signal processing means for receiving the output signal from said gate means and providing an echo estimate output signal;
   return means for receiving a return signal having echo components and providing an output signal;
   summing means connected with said product signal processing means and said return means for receiving the outputs from each for echo cancellation; and
   error developing means connected with said product signal "processing means and said return means for providing an error signal to said logic update means for causing said digital signal output having linear code spacing to be adjusted toward an indication of the actual termination network.

2. The system of claim 1 wherein said system includes first memory means for receiving said digital signal output from said linear code spacing means and storing the same.

3. The system of claim 2 wherein said termination network estimating menas includes second memory means for storing said digital signal output produced in said termination network estimating means.

4. The system of claim 1 wherein said return means includes delay means connected with said summing means.

5. The system of claim 4 wherein said delay means includes first analog switching means for switching the the output signal of the return means to a plurality of storage capacitor means, and second analog switching means for switching said storage capacitor means to a high impedance output means, said first and second analog switching means being arranged to receive "phased digital signals for controlling interdependently the first and second analog switching means.

6. The system of claim 1 wherein said termination network estimating means includes logical biasing means connected with said logic update means for causing small termination parameters to converge toward zero.

7. The system of claim 6 wherein said logical biasing means includes gating means to increase the amount of adjustment of a component of a termination network estimate when adjustment reduces the magnitude of said termination network estimate component.

8. The system of claim 7 wherein said gating means doubles the amount of adjustment of a component of the termination network estimate when the adjustment reduces the magnitude of said termination network estimate component.

9. The system of claim 1 wherein said multiplier means includes a plurality of digital-to-analog converters.

10. The system of claim 9 wherein said plurality of analog-to-digital converters have current inducing resistors connected therewith to provide a circuit which can multiply signals of positive and negative polarity with wide signal voltage swing capabilities.

11. The system of claim 1 wherein said gate means includes transistor gate means.

12. The system of claim 1 wherein said product signal processing means includes adder means and sample-hold means, said adder means being connected with said gate means to receive the output therefrom and said sample-hold means providing said echo estimate output signal.

13. The system of claim 1 wherein said error developing means includes second detector means connected with said product signal processing means for receiving the output from the product signal processing means and responsive to the output from the product signal processing means to provide an output indicative of predetermined large errors, said output of the second detector means being provided to said update logic means, and error polarity detecting means connected with said product signal processing means for receiving the output from the product signal processing means and responsive to the output from the product signal processing means to provide an output indicative of the polarity of said errors, said output of the error polarity detecting means being provided to said update logic means.

14. An echo cancelling system connectable with a termination network and utilizing linear code spacing, said system comprising;
input means for receiving a transmitted input signal;
linear code spacing means connected with said input means for providing a linearly spaced digital signal output indicative of said signal received at said input means;
first memory means for receiving said digital signal output from said linear code spacing means and storing the same;
termination network estimating means including second memory means for providing a digital signal output having linear code spacing, said termination network estimating means also including logic update means;
multiplier means including a plurality of digital-to-analog converters connected with said first memory means and said termination network estimating means to receive said digital signal outputs therefrom and pair-wise multiply the same to provide a product signal output;
first detector means connected with said logic update means to provide a control output indicative of predetermined small digital signal outputs from said logic update means;
transistor gate means connected with said multiplier means and said first detector means to receive the outputs of said multiplier means and first detector means, said output from said first detector means controlling passage of an output from said multiplier means through said transistor gate means;
adder and sample-hold means connected with said transistor gate means to receive the output therefrom and providing an echo estimate output;
return means including delay means for receiving a return signal and providing a delayed output thereof having echo components;
summing means connected with said adder and sample-hold means and said delay means for receiving the outputs therefrom for echo cancellation; and
second and third detector means connected with said adder and sample-hold means for receiving the outputs therefrom and responsive thereto providing an output indicative of the magnitude and polarity of proportionally large errors, said outputs being provided to said update logic means.

15. In an echo cancelling system having linear code spacing, a multiplier unit comprising three digital-to-analog converters, one of said digital-to-analog converters being arranged to receive a first plurality of digital input signals indicative of a received signal, and the other of said digital-to-analog converters being arranged to receive a second plurality of digital input signals indicative of a termination network, said digital-to-analog converters being operative to pair-wise multiply the digital input signals to provide a product output signal.

16. The multiplier unit of claim 15 wherein said analog-to-digital converters have current inducing resistors connected therewith.

17. In an echo cancelling system having linear code spacing, digital signal multiplier means and control gate means for controlling passage of product signals from said multiplier means, a small signal detecting unit comprising first gate means for receiving a digital signal having linear code spacing, and processing means for providing an output signal to said control gate means to preclude product signal passage when said digital signal is below a predetermined value.

18. A method for echo cancellation, said method comprising;
receiving a transmitted signal;

generating a first digital signal output from said received signal with said first digital signal output having linear code spacing;
storing said first digital signal output in a first memory;
generating a second digital signal output that is indicative of an estimate of termination parameters and having linear code spacing;
storing said second digital signal output in a second memory;
pair-wise multiplying said first and second digital signal outputs stored in said first and second memories by use of a plurality of digital-to-analog converters to provide a product output;
detecting predetermined small digital signal outputs from said second memory, and using the same to preclude passage of said product output from said converters; receiving the unprecluded product output form said converters, and in response thereto providing an echo estimated signal;
receiving a return signal having echo components;
summing said estimated signal and said return signal for echo cancellation; and
generating an error signal from said echo estimate signal and said return signal to continuously cause convergence of said actual echo components and said estimated echo.

* * * * *